United States Patent [19]
McLemore

[11] 4,316,559
[45] Feb. 23, 1982

[54] ROTARY SOLIDS FEEDER

[75] Inventor: Jerry R. McLemore, Bartlesville, Okla.

[73] Assignee: Phillips Petroleum Company, Bartlesville, Okla.

[21] Appl. No.: 127,024

[22] Filed: Mar. 4, 1980

[51] Int. Cl.³ ............................................ G01F 11/00
[52] U.S. Cl. .................................... 222/225; 222/342; 222/368
[58] Field of Search ...................... 222/342, 225, 368; 221/266

[56] References Cited

U.S. PATENT DOCUMENTS

| 77,269 | 4/1868 | Foster | 222/342 X |
| 617,563 | 1/1899 | Condon | 222/225 X |
| 1,753,278 | 4/1930 | Westberg et al. | 222/368 X |
| 2,141,815 | 12/1938 | Kelly | 222/225 |
| 2,363,961 | 11/1944 | Hart | 222/342 X |
| 2,792,152 | 5/1957 | Crowley et al. | 222/368 X |
| 3,101,853 | 8/1963 | Long et al. | 222/368 X |
| 3,139,996 | 7/1964 | Welty | 222/368 X |

*Primary Examiner*—Allen N. Knowles

[57] ABSTRACT

An apparatus for intermittently feeding a solid particulate material, in which a measured quantity of the particulate material is periodically fed into a cavity of predetermined volume and the particulate material is thereafter discharged from the cavity, substantially all of the particulate material is removed from the cavity by scraping the particulate material from the cavity simultaneously with the discharge of the material from the cavity.

11 Claims, 3 Drawing Figures

ROTARY SOLIDS FEEDER

BACKGROUND OF THE INVENTION

The present invention relates to a rotary solids feeder. In a more specific aspect the present invention relates to an improved rotary feeder for metering particulate materials and method of metering particulate materials.

In numerous operations it is often necessary to feed solid particulate materials to a reaction system or a blending operation in small quantities and with a high degree of accuracy. For example, solid particulate catalysts as well as solid chemical reactants are often added in small quantities. This is generally accomplished by the use of rotary solids feeders, of which there are numerous designs. Basically, such rotary feeders include a rotor mounted on a rotatable shaft and a sleeve-type housing surrounding the rotor and having its ends closed except for the passage of the shaft through one of the ends. The apparatus is usually mounted with the axes of the rotor and housing in a horizontal plane. An inlet is formed through the top of the sleeve portion and is fed with solid particulate material from a supply means. A diametrically opposed outlet is formed through the bottom of the sleeve portion and is connected to the system to which the particulate material is to be fed, usually by a simple conduit. At least one cavity is formed in the periphery of the rotor at a longitudinal position coinciding with the inlet and outlet openings of the housing. Accordingly, as the rotor rotates and the cavity passes the inlet opening it is filled with particulate material. This particulate material is then discharged through the outlet as the filled cavity passes the outlet. Usually there are two diametrically opposed cavities in the rotor so that as one cavity is being filled the other is discharging. Since the interior of the housing acts as a bearing surface for the rotor and the material being handled should not pass between the rotor and the housing, the fit between the two must be reasonably precise. Such close tolerance between the rotor and the housing, the very nature of the materials being handled and the characteristics of the feeder itself make it impossible to prevent some of the particulate material from passing between the rotor and housing. Consequently, when both the rotor and housing are made of metal rapid wear takes place. Accordingly, the rotor is often made of a hard resinous material, such as polyphenylenesulfide, tetrafluoroethylene, high density polyethylene, polychlorotrifluoroethylene, nylon, etc. and is mounted on the shaft and within the housing so as to be readily replaceable. Another alternative is to utilize a resinous material sleeve, which is also readily replaceable, as the inner bearing surface of the housing. Because of the close tolerance which is required between the rotor and housing and the tendency of the bearing surfaces to wear, rotors are also formed in a frusto-conical configuration and the interior of the sleeve portion of the housing is appropriately frusto-conical to receive such a rotor. To compensate for minor wear, the frusto-conical rotor can also be resiliently urged toward the minor opening of the housing. It has also been proposed to at least periodically force a fluid through the space between the bearing surfaces in order to flush out any particulate material which may collect in the space between the rotor and the housing.

While rotary solids feeders of the character described above are routinely utilized for feeding particulate materials and adequately perform the function for which they are designed, there are a number of instances in which problems are still encountered. In accordance with the present invention, it has been found that numerous particulate materials have a tendency to cake or agglomerate in the cavities of the rotor and, accordingly, fail to dump the particulate material properly. Obviously, such buildup of the particulate material in the cavities results in gross inaccuracies in the volume of material being fed, particularly where the quantity of material to be fed is extremely small. It was also found that such buildup is quite rapid, rendering the apparatus essentially useless for its intended purpose. Such caking or buildup can be caused by any number of factors, including the nature of the particulate material itself, the small particle size of the material, the necessity of feeding the material from the hopper to the rotary feeder under mechanical or fluid pressure and the like.

It is therefore an object of the present invention to overcome the above-mentioned problems, as well as other problems of the prior art devices.

Another object of the present invention is to provide an improved rotary solids feeder and method of metering solid, particulate materials.

Yet another object of the present invention is to provide a rotary solids feeder which will accurately meter particulate material.

Another and further object of the present invention is to provide a rotary solids feeder which prevents the collection or buildup of solid particulate material within the cavities of the rotor.

Still another object of the present invention is to provide an improved rotary solids feeder wherein substantially all of the solid particulate material to be fed is removed from the cavity of the rotor each time the cavity passes the outlet of the feeder.

These and other objects and advantages of the present invention will be apparent to one skilled in the art from the following description.

SUMMARY OF THE INVENTION

In a method and apparatus for intermittently feeding a solid particulate material, in which a measured quantity of the particulate material is periodically fed into a cavity of predetermined volume and the particulate material is thereafter discharged from the cavity, substantially all of the particulate material is removed from the cavity by scraping the particulate material from the cavity simultaneously with the discharge of the material from the cavity.

DESCRIPTION OF THE PREFERRED EMBODIMENTS

Figure 1:
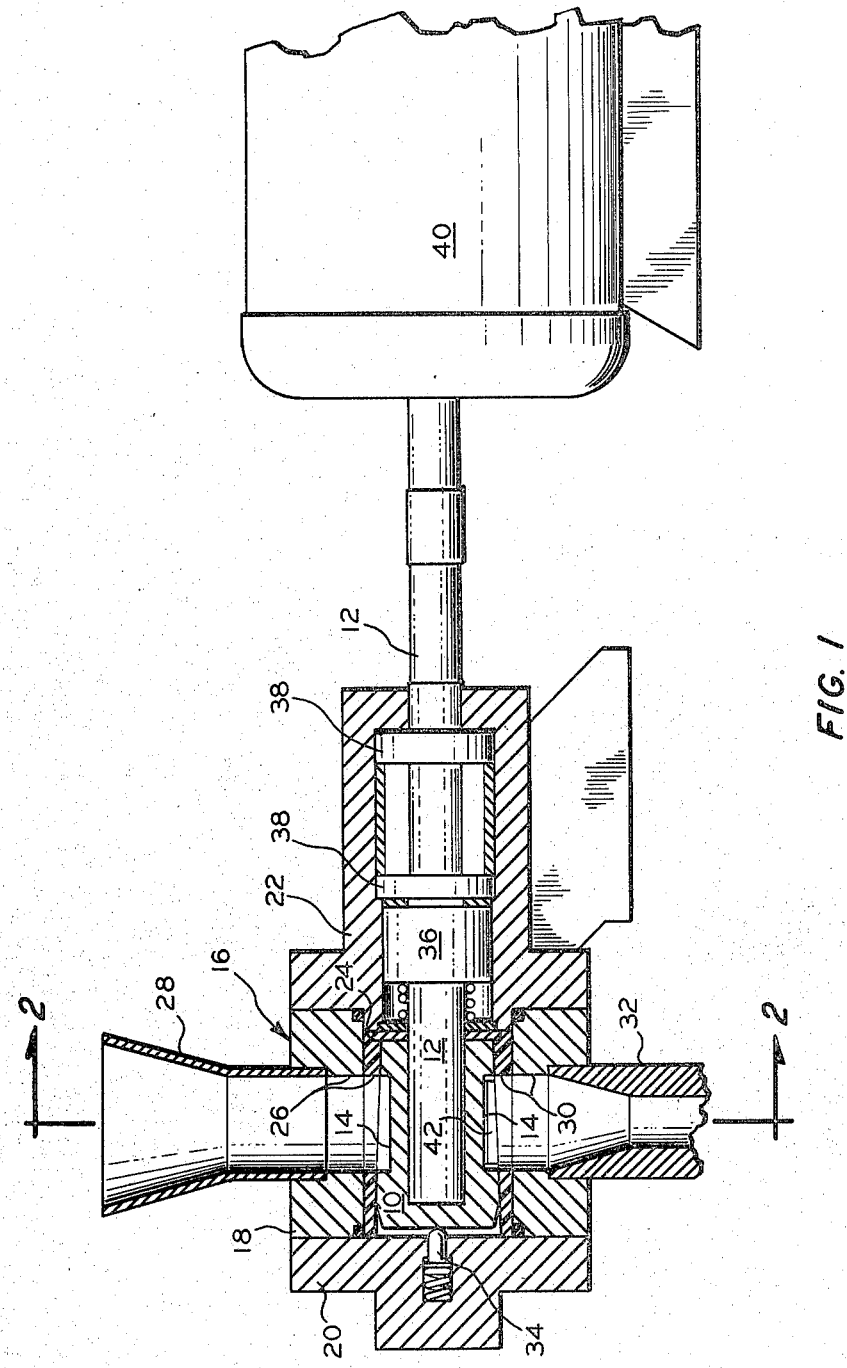
FIG. 1 is a side view, partially in section, of a rotary solids feeder in accordance with the present invention.

In FIG. 1 details of various seals, packings, bearings and other mountings have been eliminated in order to simplify the drawings and illustrate the basic structure of a suitable rotary solids feeder incorporating the present invention.

In accordance with FIG. 1, a frusto-conical rotor 10 is appropriately mounted on a drive shaft 12. Rotor 10 is desirably removably mounted on shaft 12 in order to permit replacement of rotor 10, to the extent that undue wear requires such replacement. Rotor 10 has formed in its periphery pockets or cavities 14 adapted to receive and thereafter discharge solid particulate material. As shown in FIG. 1, and preferably, there are two such cavities 14. However, a single cavity or more than two cavities could be utilized with equal convenience. Where a single cavity is utilized, the cavity would fill when in the top position and then discharge as the rotor rotates 180°. On the other hand, where two cavities are employed, as shown, one cavity is being filled while the diametrically opposed cavity is simultaneously discharging. Rotor 10 is mounted within a housing 16. Housing 16 comprises an outer sleeve portion 18, closed by end portions 20 and 22, respectively. Shaft 12 passes through end portion 22 of the housing. Housing 16 preferably includes an inner sleeve portion 24 to serve as a bearing surface for rotor 10. Inner sleeve portion 24 has its inner surface in the form of the frustum of a cone so as to closely fit about rotor 10. Rotor 10 and/or inner sleeve portion 24 of housing 16 can be fabricated from a suitable solid resin such as polyphenylenesulfide, tetrafluoroethylene, high density polyethylene, polychlorotrifluoroethylene, nylon, etc. Polyphenylenesulfide is preferably utilized for forming the liner 24. An inlet 26 is formed through outer sleeve portion 18 and inner sleeve portion 24 of housing 16. Particulate material is fed to cavity 14 of rotor 10 through inlet 26 by means of a hopper means 28 or other supply system. Outlet 30 is formed through outer sleeve portion 18 and inner sleeve portion 24 diametrically opposite inlet 26. Inlet 26 and outlet 30 will register with cavities 14 as the rotor 10 rotates. Particulate material discharged from cavity 14, passes through outlet 30 and is passed to the system to be supplied with particulate material through a conduit 32 or the like. In order to maintain a close fit between rotor 10 and inner sleeve portion 24, an axial spring plunger 34 is mounted in end 20 of the housing 16 to urge rotor 10 toward the minor opening of sleeve 24. An annular packing 36 may be provided around shaft 12 as well as a pair of annular bearings 38. Shaft 12 is coupled to a drive motor 40. Preferably, motor 40 is a variable speed motor so as to conveniently vary the volume of particulate material to be fed to the system utilizing the same. In addition, motor 40 can be connected to an appropriate automatic control system (not shown) to vary the rate of feed of particulate material in accordance with the demand of the system utilizing the particulate material.

Figure 2:
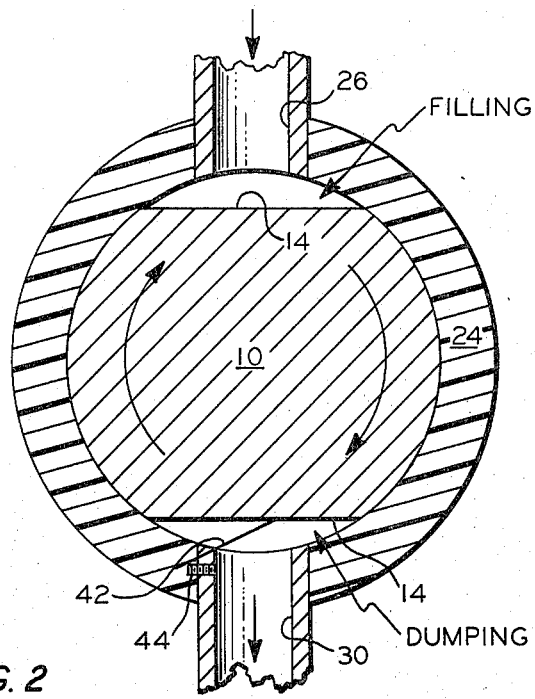
FIG. 2 is a cross-sectional view through the rotor and liner of the rotary feeder of FIG. 1 taken along the line 2—2.
Figure 3:
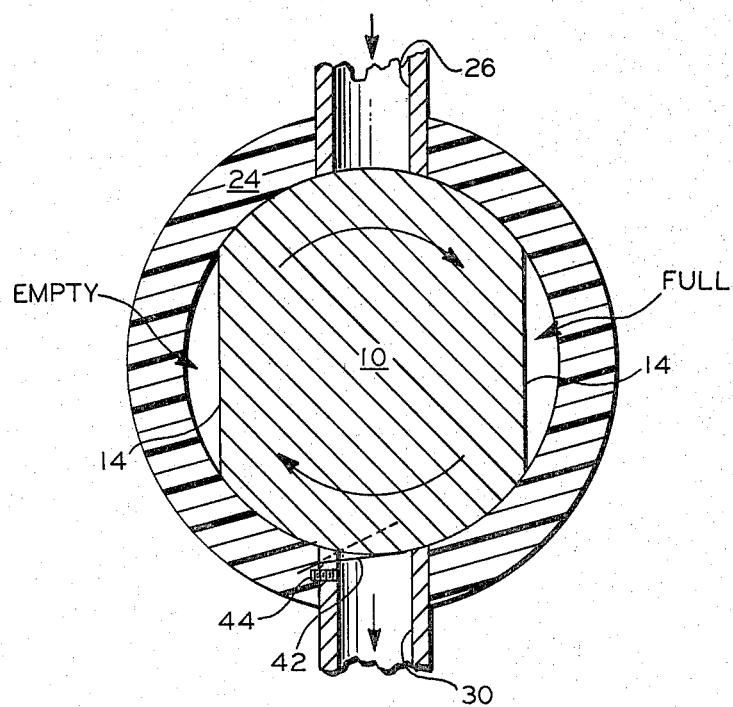
FIG. 3 is a cross-sectional view equivalent to FIG. 2, except that the rotor is shown after rotation through 90°.

In order to prevent accumulation of particulate material in cavity 14 and facilitate discharge of the particulate material, a scraper means 42 is mounted adjacent outlet 30 and is adapted to remove substantially all of the particulate material from cavity 14 as the particulate material is being discharged. FIGS. 2 and 3 more clearly show the preferred scraper means 42 and its method of mounting. Scraper means 42 is of a character to be continuously, resiliently urged toward the center of rotor 10. As shown in the drawings, a preferred form of cavities 14 is a trough cut across the periphery of rotor 10 perpendicular to the axis of the rotor. While the trough may be semicircular or other convenient form, it is preferably a trough having a flat bottom and flat sides perpendicular thereto. Cavities 14 can, of course, take other appropriate forms but a trough as described is most convenient to form and will cooperate most readily with a simple form of scraper 42. Scraper 42 has its free end shaped to conform to cavities 14. Accordingly, where cavities 14 are formed as straight-sided slots as shown, scraper 42 is simply a spring steel blade having a width substantially equal to the width of the troughs 14. Scraper 42 can be mounted in any manner and in any position in which it will perform its function of substantially completely scraping particulate material from a cavity 14. However, scraper 42 is most conveniently mounted in inner liner sleeve 24 since, as previously indicated, liner 24 can be removed and replaced as necessary. By the same token, scraper 42 can be replaceably mounted in liner sleeve 24 as shown in FIGS. 2 and 3. Specifically, the mounting end of scraper 42 is placed in a slot formed in liner 24 and is held in place by a set screw 44 or the like.

In operation, particulate material is fed through inlet 26 into uppermost cavity 14, as shown in FIG. 2. Simultaneously, with the filling of uppermost cavity 14, diametrically opposed lowermost cavity 14 is discharging. While lowermost cavity 14 is passing outlet 30, scraper 42 is continuously scraping any adhered or caked particulate material which will not dump by gravity from lowermost cavity 14, from the cavity. After 90° of rotation of rotor 10, uppermost cavity 14 of FIG. 2 will be filled with particulate material and to the right, as shown in FIG. 3, whereas emptied lowermost cavity 14 of FIG. 2 will be to the left, as shown in FIG. 3. Also, as shown in FIG. 3, after 90° of rotation of rotor 10, scraper 42 will be flexed downwardly and ride on the circumferential portion of rotor 10 between the cavities 14.

It will be obvious from the above description that in addition to assuring complete emptying of a cavity 14, scraper 42 will, to some extent, reduce the accumulation of particulate material in the space between the rotor and the liner. Specifically, since all of the particulate material is removed from the cavity by the scraper, there will be no residual material carried around as the rotor rotates from the discharge position to the fill position. Also, since scraper 42 is resiliently held against and rides on the periphery of the rotor between the cavities, scraper 42 will also scrape accumulated particulate material from the rotor at least in a band equal to the width of the scraper and thereby prevent accumulation of particulate material between the rotor and the liner where the tendency for such accumulation is greatest.

While preferred materials and structures are described above by way of illustration, it is to be understood that such specific features are not to be considered limiting.

I claim:

1. A rotary solids feeder, comprising; a horizontally disposed, generally tubular housing having an upper inlet opening through the tubular sidewall of said tubular housing and a lower outlet opening diametrically opposite said inlet opening through said tubular sidewall of said tubular housing; a solid, rotatable rotor means mounted in said tubular housing in close, bearing relationship thereto, having at least one trough cut in the outer periphery thereof in a direction perpendicular to the axis of said rotor and having a width greater than the diameter of said inlet and outlet openings; said housing being closed, except for passage therethrough of shaft means fixedly attached to said rotor and adapted to rotate said rotor; resilient scraper means having one end fixedly mounted in said tubular housing adjacent said outlet opening and a free flat end substantially equal in width to the width of the bottom of said trough resiliently urged against the bottom of said trough when said trough is passing said outlet and against the outer periphery of said rotor when said slot is not passing said outlet.

2. A feeder in accordance with claim 1 wherein the rotor is of frusto-conical configuration and the portion of the housing surrounding said rotor has a central opening of frusto-conical configuration adapted to receive said rotor in bearing relationship.

3. A feeder in accordance with claim 1 wherein the housing includes an outer sleeve and an inner sleeve in bearing relationship with the rotor.

4. A feeder in accordance with claim 3 wherein the inner sleeve is removable from the housing for replacement.

5. A feeder in accordance with claim 3 wherein scraper means is mounted in the inner sleeve with its free end bearing against the bottom of the cavity when said cavity is passing the outlet and against the periphery of said rotor when said cavity is not passing said outlet.

6. A feeder in accordance with claim 3 wherein the inner sleeve is formed from a solid resinous material.

7. A feeder in accordance with claim 6 wherein the scraper is mounted in the inner sleeve.

8. A feeder in accordance with claim 1 wherein the trough has a flat bottom and flat sides perpendicular to said bottom.

9. A feeder in accordance with claim 1 wherein two diametrically opposed cavities are formed in the rotor.

10. A feeder in accordance with claim 1 wherein the scraper has one end mounted in the housing and the opposite free end forms an acute angle with a radius of the rotor coincident with the center of the outlet.

11. A feeder in accordance with claim 1 wherein the rotor is adapted to rotate in a direction toward the free end of the scraper whereby said scraper contacts the bottom of the cavity in a plowing mode of operation.

* * * * *